United States Patent [19]
Raymond, Jr. et al.

[11] Patent Number: 5,305,781
[45] Date of Patent: Apr. 26, 1994

[54] VALVE POSITIONING MONITORING APPARATUS

[75] Inventors: Frank J. Raymond, Jr., Houston, Tex.; Frank W. Johnston, Hardgate, United Kingdom

[73] Assignee: Bray International, Inc., Houston, Tex.

[21] Appl. No.: 990,362

[22] Filed: Dec. 14, 1992

Related U.S. Application Data

[63] Continuation of Ser. No. 854,229, Mar. 20, 1992, abandoned.

[51] Int. Cl.$^5$ ............................................. F16K 37/00
[52] U.S. Cl. ..................................... 137/554; 251/292
[58] Field of Search ............... 137/554, 551; 251/291, 251/292

[56] References Cited

U.S. PATENT DOCUMENTS

| | | |
|---|---|---|
| 3,364,317 | 1/1968 | Hermle . |
| 3,367,365 | 2/1968 | Stevens ............................... 137/554 |
| 3,390,943 | 7/1968 | Myers ................................. 137/554 |
| 3,483,344 | 12/1969 | Hermle . |
| 3,522,596 | 8/1970 | Fowler et al. ....................... 137/554 |
| 3,839,925 | 10/1974 | Ficken et al. . |
| 4,238,654 | 12/1980 | Hermle . |
| 4,348,568 | 9/1982 | Hermle . |
| 4,424,423 | 1/1984 | Hermle . |
| 4,872,482 | 10/1989 | Jarrett ................................. 137/554 |

FOREIGN PATENT DOCUMENTS 7321672 9/1973 Fed. Rep. of Germany .
2912914 10/1980 Fed. Rep. of Germany .

OTHER PUBLICATIONS

Keystone Brochure, Figs. 792;793. 1991.
Drawing No. 8738-A "Cam Assembly F777/F778 Electric Actuator Standard Assembly". May 3, 1988.
Drawing No. 8756 "Cam Assembly F777/F778 Electric Actuator Standard & Auxiliary Assembly". May 23, 1988.
Advertisement of "Eliminator 3000," Automatic Switch Company (ASCO 8320 A90). Oct. 1991.
Advertisement of "Accutrak 2000," Westlock Controls. Sep. 1991.

*Primary Examiner*—A. Michael Chambers
*Attorney, Agent, or Firm*—Vaden, Eichenroht, Thompson, Boulware & Feather

[57] ABSTRACT

These is disclosed apparatus for monitoring the rotative position of a rotary closure member of a valve, wherein a shaft is rotatably mounted in a housing for connection to a part exterior of the housing which rotates in response to rotation of the closure member, and cam rings are assembled for rotation about the shaft through pinion gears rotatable with the shaft to cause cam surfaces about the rings to engage and activate switches in the housing.

5 Claims, 2 Drawing Sheets

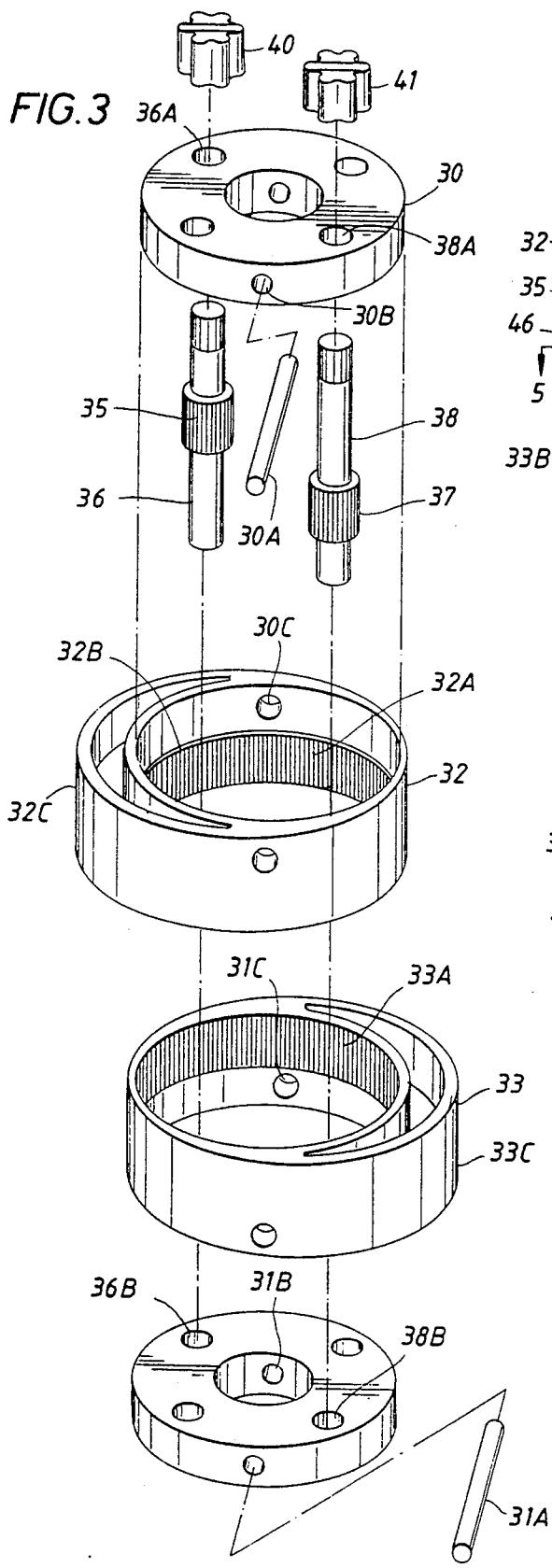
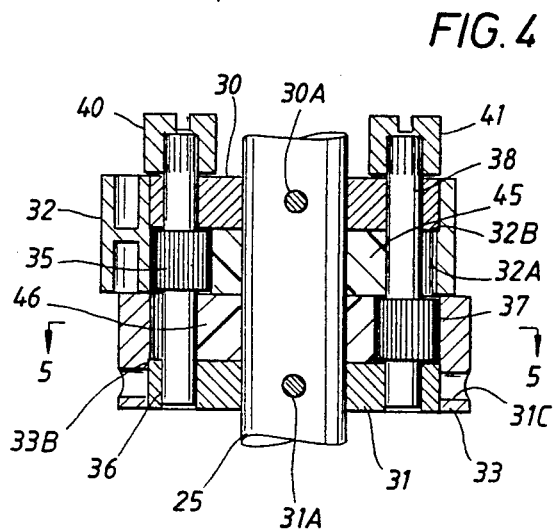
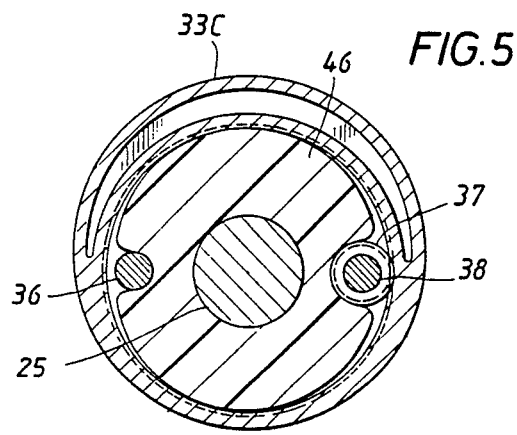
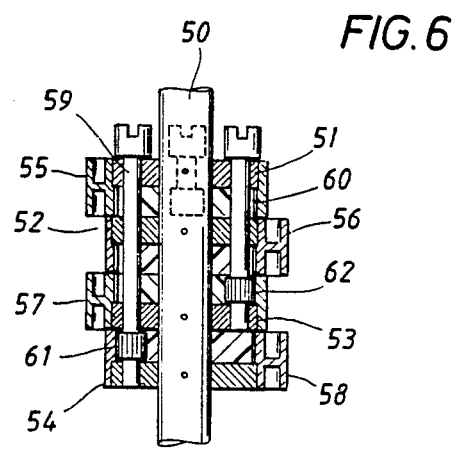

VALVE POSITIONING MONITORING APPARATUS

This application is a continuation of Ser. No. 07/854,229 filed Mar. 20, 1992, now abandoned.

This invention relates generally to apparatus for use in monitoring the position of the closure member of a valve, relative to its opened and closed positions, and thus, in the case of a rotary valve such as a butterfly valve, the rotative position of the rotary closure member. More particularly, it relates to improvements in apparatus of this type in which the position of the closure member is sensed by switches as they are engaged and activated by cams rotatable with a shaft connectible to a part which rotates in response to rotation of the closure member.

Typically, apparatus of this type is used to indicate the position of the closure member or to cause an event to occur at a location removed from the valve itself as the closure member approaches either its open or its closed position. Although movement of the closure member into either such position is normally sensed by the actuator for so moving it, the closure member, and thus the actuator, may not travel the full extent of its intended movement. Thus, for example, due to tolerances or the like, the disc of a butterfly valve may not move a full ninety degrees between a closed position perpendic-ular to its seat and an open position parallel to the axis of the seat.

It has therefore been proposed to provide apparatus of the type above described wherein the cams are so arranged on the shaft as to activate the switches just before the closure member has reached its fully closed and open positions. Thus, the surfaces of the cams engagable with the switches are spaced apart about the axis of the shaft a circumferential extent of somewhat less than ninety degrees in the case of a typical butterfly valve. There may be need, however, to adjust the rotative positions of the cams on the shaft, either upon installation or during use of the valve, or both. Also, adjustment of the cams about the shaft permits use of the apparatus with valves having different extents of rotative stroke between opened and closed positions.

The primary object of this invention is to provide apparatus of the type described in which the cams are easily and quickly adjustable and which is relatively inexpensive to manufacture.

More particular objects are to provide such apparatus in which the parts requiring manipulation during adjustment are so identified as to minimize errors during installation and/or repair, and in which there is little tendency for the cams, once adjusted, to move out of adjusted positions.

These and other objects are accomplished, in accordance with the illustrated embodiment of the invention, by apparatus of the type described which comprises a housing having an opening through one side, and a shaft rotatably mounted in the housing opening and having means thereon connectible to a part exterior of the housing which rotates in response to rotation of the closure member. First and second plates surround and are fixed to the shaft in axially spaced relation within the housing, a first ring closely surrounds the first plate for rotation with respect thereto and has a circle of teeth formed about the interior thereof, and a second ring closely surrounds the second plate for rotation with respect thereto and has a circle of teeth thereabout. First and second rods are mounted on the plates for rotation about axes parallel to the axis of rotation of the shaft, a pinion gear on the first rod engages the circle of teeth of the first ring, and a pinion gear on the second rod engages the circle of teeth of the second ring. More particularly, each ring has an outer cam surface eccentric to its axis of rotation, first and second switches are mounted in the housing in position to be engaged and activated by the cam surfaces on the first and second rings, respectively, so as to sense the rotation of the shaft into angularly spaced positions, and manually manipulative means are provided on the ends of the rods to permit adjustment of the rotation position of each cam surface. As illustrated, the shaft has a pair of holes therethrough, the end plates have holes therethrough aligned with the holes in the shaft, and pins are received in the holes to fix the plates to the shaft, and the first ring is held axially between the second ring and the first plate, and the second ring is held axially between the first ring and the second plate.

In the preferred embodiment of the invention, and in accordance with another novel aspect of the invention, the manually manipulative means on the end of the first rod and the first ring are of the same first color, and the manually manipulative means on the end of the second rod and the second ring are of the same second color, thus visually relating them in a manner to reduce the possibility of improper assembly and/or manipulation of the wrong cam ring. In accordance with still another novel aspect of the invention, a first body of resilient material tightly surrounds the shaft and tightly engages with the teeth of the first ring and first pinion gear so as to frictionally resist rotation of the first ring, and a second body of resilient material tightly surrounds the shaft and tightly engages with the teeth of the second ring and second pinion gear so as to frictionally resist rotation of the second ring, thus reducing the tendency of the cam rings to move out of adjustment, despite vibrations or other ambient conditions which might otherwise cause them to be so moved.

In the drawings, wherein like reference characters are used throughout to designate like parts:

FIG. 3 is an exploded view of cam rings engagable with switches mounted in the housing of the apparatus, rods having pinion gears for engaging the circle of teeth about the cam rings, and end plates adapted to be fixed to the shaft connectable to a part rotatable with the closure member for retaining the cam rings and gears in assembled positions;

FIG. 4 is a vertical sectional view, on an enlarged scale, of the cam rings, rods and plates of FIG. 3 shown assembled on the shaft;

FIG. 5 is a horizontal sectional view through the asembly of cam rings, rods and plates, as seen along broken lines 5—5 of FIG. 4; and FIG. 6 is a vertical sectional view of an assembly for use with an alternative embodiment of the apparatus for monitoring four rotative positions of the shaft.

Figure 1:
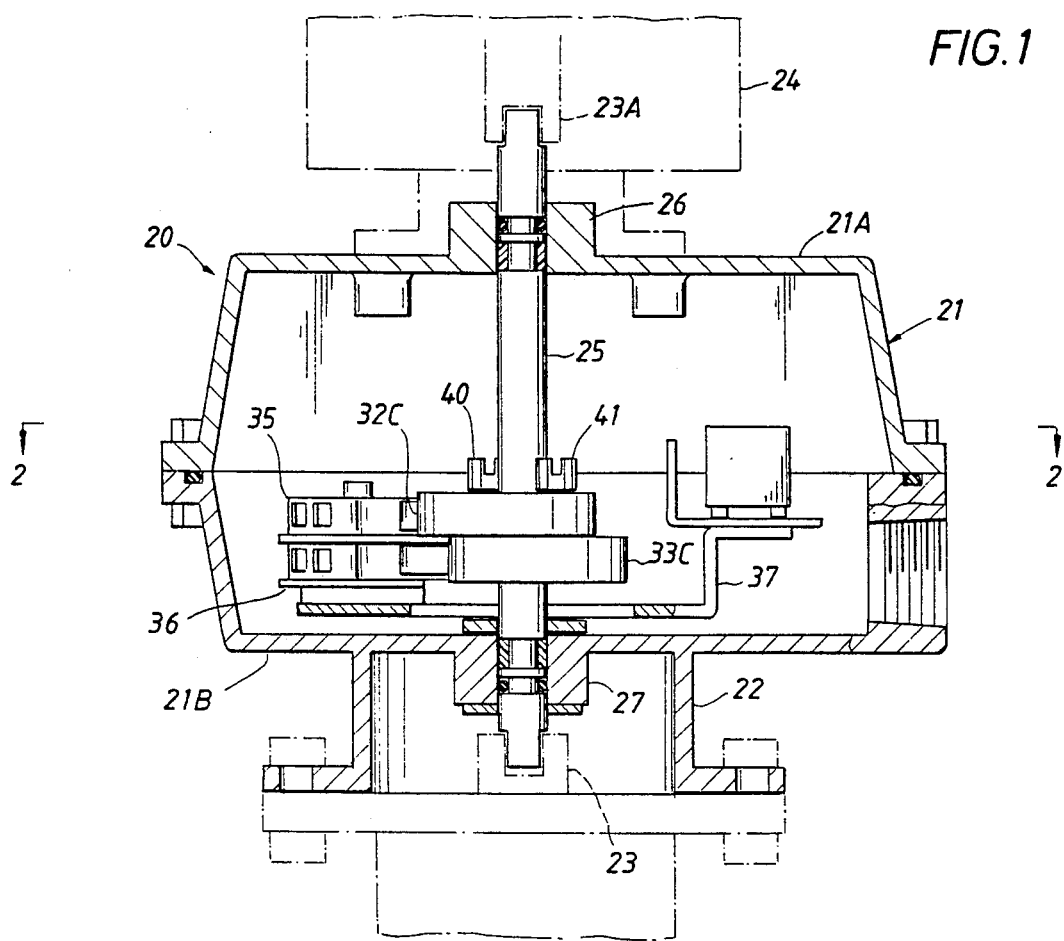
FIG. 1 is a vertical sectional view through valve position monitoring apparatus constructed in accordance with the preferred embodiment of the inventions with the lower and upper ends of a rotary shaft thereof connected, respectively, with the upper end of a rotary closure member of a valve and the lower end of the rotary shaft of a valve position indicator, as shown by broken lines.
Figure 2:
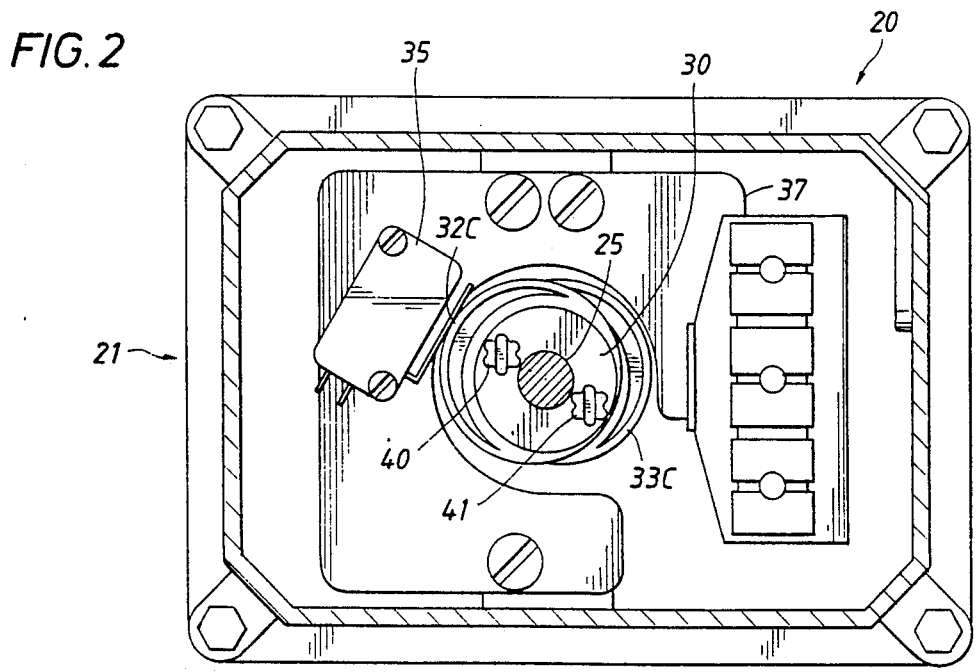
FIG. 2 is a horizontal sectional view of the apparatus, as seen along broken lines 2—2 of FIG. 1.

With reference now to the details of the above described drawings, the overall monitoring apparatus, which is best shown in FIGS. 1 and 2, and which is indicated in its entirety by reference character 20, includes a weather-proof housing 21 or enclosure having a pedestal 22 at its lower end adapted to be installed on the upper end of the valve to be monitored, or an actuator for rotating the closure member of the valve between opened and closed positions. In any case, and as shown in broken lines, a shaft 23 rotatable with the closure member or a part which rotates in response to rotation of the closure member is disposed centrally within the pedestal, and another housing, which may be a valve position indicator, is installed on the top wall 21A of the housing with its rotatable shaft 23A aligned with the shaft 23.

A shaft 25 is mounted within the housing 21 with its upper end extending closely through an upstanding boss 26 on the top wall 21A of the housing and its lower end extending closely through a depending boss 27 on the bottom wall 21B and within the pedestal 22. More particularly, as indicated, the lower end of the shaft 25 is connected for rotation with the rotatable part 23, and the upper end thereof is connected to the shaft 23A for rotating it. The diameters of the upper and lower ends of the shaft within the bosses 26 and 27 are reduced to receive suitable seal rings and bearing sleeves within the openings through the bosses.

As best shown in FIGS. 3-5, upper and lower plates 30 and 31 have holes therethrough for closely surrounding the shaft 25 in vertically spaced apart locations and are fixed to the shaft for rotation therewith by means of pins 30A and 31A, respectively, which extend through aligned holes in the shaft and plates. A first cam ring 32 closely surrounds the first plate 30 for rotation with respect to it and has a circle of teeth 32A formed about the inside thereof, and a second ring 33 closely surrounds the second plate 31 for rotation with respect to it and has a circle of teeth 33A formed about the inside thereof.

More particularly, and for reasons to be described to follow, the cam ring 32 is of greater axial extent than the plate 30, and the cam ring 33 is of greater axial extent than the plate 31, with the upper portion of the ring 32 closely surrounding the plate 30 and the lower portion of the ring 33 closely surrounding the plate 31. More particularly, the upper ring 32 is held against upward movement with respect to the plate 30 by means of a shoulder 32B thereabout at the top of the circle of teeth 32A in position to be engaged by a shoulder about the lower periphery of the plate 30. The lower ring 33 is held against downward movement by means of a downwardly facing shoulder 33B about the lower end of its circle of teeth 33A adapted to be engaged by a shoulder about the upper outer periphery of the plate 31. Thus, the rings 32 and 33 are held in end-to-end relation upon installation of the pins 30A and 31A connecting the plates to the shaft 25. For this latter purpose, holes 30C and 31C are formed through the cam rings 32 and 33, respectively, to permit installation of the pins, which are of such radial extent as to connect the shaft to the plates, but still permit the cam rings to rotate with respect to the plates.

As shown, and as previously described, each of the cam rings has a cam surface thereabout which is eccentric to its axis of rotation, and thus the circle of teeth in the cam ring, and thus the axis of rotation of the shaft 25. Thus, the upper ring 32 has a cam surface 32C thereabout, while the lower ring 33 has a cam surface 33C thereabout. More particularly, and as will be described in detail to follow, the cam surfaces on the cam rings are so arranged in the housing 21 as to engage and activate switches mounted in the housing as the closure member approaches its opened and closed positions, thereby transmitting a signal to a location exterior of the housing which may activate a visual or audible signal of some type, or causing other parts of a system including the valve to be activated.

As best shown in FIGS. 1 and 2, there are, in this embodiment of the invention, two such switches 10 and 11 appropriately mounted on a platform 12 within the housing. As shown, each such switch has a reed for contact with and thus actuation by a cam surface as it is engaged by such surface during its rotation with the shaft. More particularly, the upper switch 10 is mounted with its reed on the same lateral level as the cam surface 32C of the cam ring 32, and the lower switch 11 is mounted with its reed on the same lateral level as the cam surface 33C of the lower cam ring 33.

As previously described, each of the cam rings is independently moved into and held in a predetermined rotational position with respect to the shaft by means of pinion gears mounted on rods rotatably mounted in the plates 30 and 31. Thus, pinion gear 35 mounted about a rod 36 rotatably mounted within the plates 30 and 31 is adapted to drivingly engage the circle of teeth 32A about the ring 32. Also, pinion gear 37 on a rod 38 rotatably mounted in the end plates 30 and 31 is positioned for driving engagement with the circle of teeth 33A about the cam ring 33. More particularly, the upper end of rod 36 extends closely through a hole 36A in the upper plate 30, and the lower end of the rod extends closely through a hole 36B in the lower plate 31. The upper end of the rod 38, on the other hand, extends closely within a hole 38A in the upper plate 30, and the lower end of the rod extends closely within an opening 38B in the lower plate. As best shown in FIG. 4, the pinion 35 is restrained against substantial vertical movement between the lower side of the plate 30 and the upper side of the cam ring 33. Pinion gear 37, on the other hand, is restrained against substantial vertical movement between the lower side of the cam ring 32 and upper side of the plate 31.

As shown, the holes 36A and 38A and 36B and 38B are located diametrically opposite one another, although this, of course, may vary as long as the pinion gears on the rods do not interfere with one another. As also shown, there are additional holes formed through the plates to receive the ends of additional rods having pinion gears rotatable for driving engaging with additional cam rings, as may be desired in connection with an alternative embodiment of the invention, as will be described in connection with FIG. 6, for example.

As previously described, rotation of the rods causes the pinion gears to move the cam rings with which they are engaged into a desired rotational position with respect to the shaft 25. This may be necessary, for example, during original installation of the monitoring apparatus. Also, it may be found that the switch to be engaged by the cam surface of the cam ring should be engaged either somewhat earlier or somewhat later than was the case when the rod was originally in a somewhat different position than when the assembly was first installed. Furthermore, it may be found that the rods with their pinion gears are caused to move out of their original position, due to vibration of the surrounding equipment, or for other reasons. In any case, individual rotation of the rods permits each cam ring to be moved into the desired position with respect to the shaft and, thus, with respect to the opened and closed positions of the closure member of the valve.

Adjustment of the rods is facilitated by means of knobs or caps on their upper ends. Thus, a first cap 40 is disposed over the upper end of the rod 36 above the plate 30, while a cap 41 is disposed over the upper end of the rod 38 above the upper end of the plate 30. As shown, these caps or knobs are knurled to facilitate fine adjustment of the rotative positions of the pinion gears.

In accordance with another novel aspect of the present invention, the rods and the cam rings with which their pinion gears engage are color coded to one another. Thus, for example, the cap 40 and the cam ring 32 may be of a red color, while the cap 41 and cam ring 33 may be of a green color. As previously noted, this reduces the likelihood of error in adjusting of the rotative positions of the wrong cam ring.

In accordance with a still further novel aspect of the invention, a body 45 of suitable resilient material is disposed in surrounding relation to the shaft 25 beneath the upper plate 30 on the same vertical level as the circle of teeth 32A of the cam ring 32. More particularly, the body is of such shape that it tightly engages about the shaft and tightly engages the peaks of the circle of teeth 32A as well as pinion gear 35 so as to frictionally resist rotation of the cam ring from out of its adjusted position. Similarly, a body of resilient material 46 tightly surrounds the shaft 25 and tightly engages the peaks of the circle of teeth 33A and the pinion gear 37 just above the top side of the plate 31. Preferably, the bodies are of such height as to be held closely against one another as well as the lower side of the upper plate and the upper side of the lower plate. As shown in FIG. 5, opposite side edges of the bodies may be cut out to receive a pinion gear as well as the rod on which the other pinion gear is mounted. Preferably, the cutouts in the bodies of resilient material are so formed as to tightly engage the pinion gears as well as the rods so as to further frictionally resist the rotation.

The assembly and disassembly of the plates, cam rings and pinion gear rods will be apparent from the foregoing description, particularly in connection with the exploded view of FIG. 3. Thus, during assembly, the lower plate 31 would be fixed to the shaft 25, and the lower cam ring lowered into supported position on the plate, following which the lower end of the rod 38 would be lowered into hole 38B in the lower plate. Then, the body 46 would be installed within the upper end of cam ring 33; the lower end of rod 36 lowered through the lower cam ring and into hole 36B, and the upper cam ring 32 lowered onto the lower cam ring with the circle of teeth engaged with pinion gear 35. To complete the assembly, body 45 would be lowered into the ring 32 with its cut-outs opposite rods 36 and 38, and the upper plate 30 lowered into the upper end of the upper cam ring and over rods 36 and 38 and then fixed to the shaft by pin 30A, following which the knobs 40 and 41 may be installed. Then, when pins 30A and 31A are within the inner diameters of the cam rings, the latter may be rotated into desired positions by manipulation of the knobs.

The alternative embodiment of the assembly of the apparatus shown in FIG. 6 differs from that above described in connection with FIGS. 1 to 5 primarily in that it includes four cam rings and means for independently adjusting the rotative position of each. Thus, as shown in FIG. 6, a shaft 50 extends closely through holes in vertically arranged plates 51, 52, 53 and 54, with pins (not shown) being extended through aligned holes in the shaft and the plates to hold them in desired vertical positions with respect to the shaft. In this case, with the plates 51 and 54 located at opposite ends of the assembly, it may be necessary to fix only these plates to the shaft.

As also shown, a cam ring 55 closely surrounds the plate 51, a cam ring 56 closely surrounds the plate 52, a cam ring 57 closely surrounds the plate 53, and a cam ring 58 closely surrounds the plate 54. More particularly, each cam ring has a circle of teeth formed about its axis of rotation opposite pinion gears carried on rods rotatably supported by the plates. Only two such rods 59 and 60 are shown in FIG. 6, the rod 59 supported by plates 51 and 54 having a pinion gear 61 thereabout for engaging the circle of teeth of the cam ring 58, and the rod 60 supported by plates 51 and 53 having a pinion gear 62 thereabout drivingly engagable with the circle of teeth in the cam ring 57. Additional rods would, of course, be extended through the additional holes in the plate 51 as well as holes in the plates 52 and 53 to dispose pinion gears thereon in driving engagement with the circle of teeth about the cam rings 55 and 56.

As also shown in FIG. 6, bodies of resilient material may be disposed tightly about the shaft as well as in tight engagement with the circle of teeth and the pinion gears at the laterally opposite portions of the cam rings. Additionally, it is anticipated that all four rods may be independently color coded to their respective cam rings.

As shown, the housing 21 is a switch box. Alternatively, it could be the enclosure for a valve actuator.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for monitoring the rotative position of a rotary closure member of a valve, comprising
   a housing having an opening through one side,
   a shaft rotatably mounted in the housing opening and having means thereon connectible to a part exterior of the housing which rotates with the closure member,
   first and second plates surrounding and fixed to the shaft in axially spaced relation within the housing,
   a first ring closely surrounding the first plate for rotation with respect thereto and having a circle of teeth formed about the interior thereof,
   a second ring closely surrounding the second plate for rotation with respect thereto and having a circle of teeth thereabout, first and second rods mounted on the plates for rotation about axes parallel to the axis of rotation of the shaft, a pinion gear on the first rod engaging the circle of teeth of the first ring, a pinion gear on the second rod engaging the circle of teeth of the second ring, each ring having an outer cam surface eccentric to its axis of rotation, first and second switches mounted in the housing in position to be engaged and activated by the cam surfaces on the first and second rings, respectively, so as to sense the rotation of the shaft into angularly spaced positions, and manually manipulative means on the end of each rod to permit adjustment of the rotation position of the cam surfaces on the rings.

2. Apparatus of the character defined in claim 1, wherein the shaft has a pair of holes therethrough, the end plates have holes therethrough aligned with the holes in the shaft, and pins are received in the holes to fix the plates to the shaft.

3. Apparatus of the character defined in claim 1, wherein the first ring is held axially between the second ring and the first plate, and the second ring is held axially between the first ring and the second plate.

4. Apparatus for monitoring the rotative position of a rotary closure member of a valve, comprising a housing having an opening through one side, a shaft rotatably mounted in the housing opening and having means thereon connectible to a part exterior of the housing and rotatable with the closure member, first and second plates surrounding the shaft, a first ring closely surrounding the first plate for rotation with respect thereto and having a circle of teeth formed about the interior thereof, a second ring closely surrounding the second plate for rotation with respect thereto and having a circle of teeth thereabout, means holding the plates and rings in end to end relation along the shaft, first and second rods mounted on the plates for rotation about axes parallel to the axis of rotation of the shaft, a pinion gear on the first rod engaging the circle of teeth of the first ring, a pinion gear on the second rod engaging the circle of teeth of the second ring, each ring having an outer cam surface eccentric to its axis of rotation, first and second switches mounted in the housing in position to be engaged and activated by the cam surfaces on the first and second rings, respectively, so as to sense the rotation of the shaft into angularly spaced positions, first manually manipulative means on one end of the first rod to permit adjustment of the rotation position of the cam surface on the first ring, and second manually manipulative means on one end of the second rod to permit adjustment of the rotation position of the cam surface of the second ring, the first manually manipulative means on the end of the first rod and the first ring being of the same first color, and the second manually manipulative means and the second ring being of the same second color.

5. Apparatus for monitoring the rotative position of a rotary closure member of a valve, comprising a housing having an opening through one side, a shaft rotatably mounted in the housing opening and having means thereon connectible to a part exterior of the housing which rotates with the closure member, first and second plates surrounding the shaft, a first ring closely surrounding the first plate for rotation with respect thereto and having a circle of teeth formed about the interior thereof, a second ring closely surrounding the second plate for rotation with respect thereto and having a circle of teeth thereabout, means holding the plates and rings in end to end relation along the shaft, first and second rods mounted on the plates for rotation about axes parallel to the axis of rotation of the shaft, a first pinion gear on the first rod engaging the circle of teeth of the first ring, a second pinion gear on the second rod engaging the circle of teeth of the second ring, each ring having an outer cam surface eccentric to its axis of rotation, first and second switches mounted in the housing in position to be engaged and activated by the cam surfaces on the first and second rings, respectively, so as to sense the rotation of the shaft into angularly spaced positions, manually manipulative means on the end of each rod to permit adjustment of the rotation position of the cam surfaces on the rings, a first body of resilient material tightly surrounding the shaft and tightly engaged with the teeth of the first ring and first pinion gear so as to frictionally resist rotation of the first ring, and a second body of resilient material tightly surrounding the shaft and tightly engaged with the teeth of the second ring and second pinion gear so as to frictionally resist rotation of the second ring.

* * * * *